(12) United States Patent
Yamada (10) Patent No.: US 9,031,423 B2
(45) Date of Patent: May 12, 2015

(54) PRINTING SYSTEM, PRINTING DEVICE, AND PRINTER DRIVER

(75) Inventor: Akihiro Yamada, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 872 days.

(21) Appl. No.: 12/732,867

(22) Filed: Mar. 26, 2010

(65) Prior Publication Data

US 2010/0276870 A1  Nov. 4, 2010

(30) Foreign Application Priority Data

Apr. 30, 2009 (JP) ................................ 2009-111607

(51) Int. Cl.
*G03G 15/00* (2006.01)
*G06F 3/12* (2006.01)
*B41J 3/60* (2006.01)
(Continued)

(52) U.S. Cl.
CPC ................. *G06F 3/1285* (2013.01); *B41J 3/60* (2013.01); *B41J 13/0009* (2013.01); *G03G 15/234* (2013.01); *G03G 15/6579* (2013.01); *G03G 15/70* (2013.01); *G03G 2215/0043* (2013.01); *G03G 2215/00548* (2013.01);
(Continued)

(58) Field of Classification Search
CPC .......... G03G 2215/0043; G03G 15/70; G03G 15/6579; G03G 2215/00586; G03G 2215/00548; G06F 3/121; G06F 3/1285; B41J 3/0009
USPC ........................................ 399/18, 21, 401, 85
See application file for complete search history.

(56) References Cited

U.S. PATENT DOCUMENTS

| 5,557,367 A | 9/1996 | Yang et al. ........................ 399/14 |
| 2002/0018679 A1 | 2/2002 | Miyajima ...................... 399/389 |

(Continued)

FOREIGN PATENT DOCUMENTS

| EP | 0 735 430 A2 | 10/1996 |
| JP | A-08-324051 | 12/1996 |

(Continued)

OTHER PUBLICATIONS

Decision of Patent Grant dated Oct. 13, 2011 received from the Japanese Patent Office in JP 2009-111607, together with an English-language translation.

(Continued)

*Primary Examiner* — Judy Nguyen
*Assistant Examiner* — Jennifer Simmons
(74) *Attorney, Agent, or Firm* — Scully, Scott, Murphy & Presser, P.C.

(57) ABSTRACT

A printing system includes: a printing unit that performs printing on a sheet; a conveyance mechanism that has a printing path for guiding a sheet to a printing position of the printing unit and a reverse path for reversing the sheet passing through the printing position and guiding the sheet again to the printing position; a control unit that performs double-side printing processing depending on a plurality of methods in which maximum numbers of the sheets existing in the conveyance mechanism at the same time are different from each other; and a determination unit that determines a probability of sheet jamming occurring in the conveyance mechanism. When the determination unit determines that the jamming occurrence probability is high, the control unit selects the method in which the maximum sheet number is small, and performs the double-side printing processing in accordance with the selected method.

7 Claims, 10 Drawing Sheets

(51) Int. Cl.
  *B41J 13/00*    (2006.01)
  *G03G 15/23*    (2006.01)

(52) U.S. Cl.
  CPC ..... *G03G 2215/00586* (2013.01); *G06F 3/121* (2013.01); *G06F 3/1234* (2013.01)

(56) References Cited

U.S. PATENT DOCUMENTS

| | | | |
|---|---|---|---|
| 2003/0059223 A1 | 3/2003 | Ushio et al. | 399/75 |
| 2003/0190179 A1 | 10/2003 | Kinoshita et al. | |
| 2004/0076444 A1 | 4/2004 | Badovinac et al. | |
| 2005/0240376 A1 | 10/2005 | Uwatoko et al. | |
| 2006/0133875 A1 | 6/2006 | Okada et al. | |
| 2007/0264039 A1 | 11/2007 | Saito et al. | |
| 2009/0179924 A1 | 7/2009 | Okada et al. | |
| 2010/0129094 A1 | 5/2010 | Maeda et al. | 399/38 |
| 2010/0276870 A1 | 11/2010 | Yamada | |
| 2010/0322640 A1 | 12/2010 | Yamada | |

FOREIGN PATENT DOCUMENTS

| | | |
|---|---|---|
| JP | 11-284818 A | 10/1999 |
| JP | 2002-37540 | 2/2002 |
| JP | 2003-98910 | 4/2003 |
| JP | 2003-274081 | 9/2003 |
| JP | 2005-41229 | 2/2005 |
| JP | 2005041229 A * | 2/2005 |
| JP | 2005-221821 | 8/2005 |
| JP | 2006-297654 | 11/2006 |
| JP | 2007-30476 A | 2/2007 |
| JP | 2007-58027 | 3/2007 |
| JP | 2008-90219 | 4/2008 |
| JP | 2008-296594 | 12/2008 |
| JP | 2009-6484 | 1/2009 |
| JP | 2009-046303 | 3/2009 |
| JP | 2009-75153 | 4/2009 |
| WO | WO 2009/014033 A1 | 1/2009 |

OTHER PUBLICATIONS

Extended European Search Report dated Mar. 26, 2012 received from the European Patent Office from related European Application No. 10003226.7.

Japanese Official Action dated Apr. 19, 2011 together with an English language translation from JP 2009-111607.

Japanese Official Action dated Apr. 19, 2011 together with an English language translation from related JP 2009-111606.

U.S. Official Action dated Jul. 17, 2012 from related application U.S. Appl. No. 12/732,632.

U.S. Official Action dated Mar. 5, 2013 in related U.S. Appl. No. 12/732,632.

Chinese Decision on Rejection dated Oct. 10, 2012 received from the Chinese Patent Office from related Chinese Application No. 201010156867.8, together with an English language translation.

* cited by examiner

| PRINTING SETTING | | | | |
|---|---|---|---|---|
| DOUBLE SIDED SETTING CONDITION | | METHOD LINKAGE SELECTION TRAY 1 ▼ | | |
| DOUBLE-SIDE PRINTING | OFF ○ ON ◉ | | MAXIMUM SHEET NUMBER:ONE | MAXIMUM SHEET NUMBER: TWO |
| REVERSING METHOD | OFF ○ ON ◉ | REQUIRED TIME | 40 SECONDS | 30 SECONDS |
| MAXIMUM SHEET NUMBER | ONE ◉ TWO ○ | INDIVIDUAL JAMMING OCCURRENCE PROBABILITY | 1.0% | 1.2% |
| | | REVERSING JAMMING OCCURRENCE PROBABILITY | 0.5% | 1.0% |
| OK | CANCEL | APPLICATION (A) | | HELP |

JAMMING INFORMATION TABLE

| | ACCUMULATIVE NUMBER OF PRINTED SHEETS | NUMBER OF INDIVIDUAL JAMMING | INDIVIDUAL JAMMING OCCURRENCE PROBABILITY | NUMBER OF INDIVIDUAL REVERSING JAMMING | INDIVIDUAL REVERSING JAMMING OCCURRENCE PROBABILITY | REQUIRED TIME |
|---|---|---|---|---|---|---|
| 2413 METHOD | 580 | 7 | 1.2% | 6 | 1.0% | 30 SECONDS |
| 21 METHOD | 190 | 2 | 1.0% | 1 | 0.5% | 40 SECONDS |

PRINTING SYSTEM, PRINTING DEVICE, AND PRINTER DRIVER

CROSS REFERENCE TO RELATED APPLICATION

The present application claims priority from Japanese Patent Application NO. 2009-111607, which was filed on Apr. 30, 2009, the disclosure of which is incorporated herein by reference in its entirety.

BACKGROUND

The present invention relates to a printing system having a double-side printing function, a printing device, and a printer driver.

In a method which is well-known as a double-side printing method of a printing device, printing on one side and printing on the other side are continuously performed for each sheet. Hereinafter, this method is referred to as a double side continuous printing method. On the other hand, there is provided a printing device adopting a method in which between printing on one side and printing on the other side of one sheet, one side of another sheet is printed. In other words, the method includes a method of continuously performing printing on one side for a plurality of sheets (refer to JP11-284818A). Hereinafter, this method is referred to as a one sided continuous printing method. According to the one sided continuous printing method, a period from printing on one side of one sheet to printing on the other side of the sheet may be used for printing another sheet. Accordingly, it is possible to perform the printing processing at a higher speed than in the double side continuous printing method.

SUMMARY

The above-described one sided continuous printing method has an advantage in that the printing processing can be performed at a higher speed than in the double side continuous printing method. In the one sided continuous printing method, however, a larger number of sheets may exist in a sheet conveyance path inside the printing device at the same time compared to the double side continuous printing method. Therefore, in the one sided continuous printing method, when the double-side printing processing is stopped by sheet jamming or blackout, a larger number of sheets may be held in the sheet conveyance path than in the double side continuous printing method. Therefore, it may take a lot of time to remove the sheets. In some cases, the one sided continuous printing method should be used or should not be used. In image forming devices according to the related art, however, such an aspect is not sufficiently considered. Therefore, there is a demand for the improvement of convenience.

An object of the present invention is that it provides a printing system capable of performing double-side printing processing in accordance with a method depending on the state of a printing device, a printing device, and a printer driver.

According to an aspect of the present invention, a printing system includes:
a printing unit that performs printing on a sheet;
a conveyance mechanism that has a printing path for guiding a sheet to a printing position of the printing unit and a reverse path for reversing the sheet passing through the printing position and guiding the sheet again to the printing position;
a control unit that performs double-side printing processing depending on a plurality of methods in which maximum numbers of the sheets existing in the conveyance mechanism at the same time are different from each other; and
a determination unit that determines a probability of sheet jamming occurring in the conveyance mechanism,
wherein when the determination unit determines that the jamming occurrence probability is high, the control unit selects the method in which the maximum sheet number is small compared with when it is determined that the occurrence probability is low, and performs the double-side printing processing in accordance with the selected method.

DESCRIPTION OF EXEMPLARY EMBODIMENTS

Exemplary embodiments of the present invention will be described with reference to the drawings.

1. Electrical Configuration of Printing System

Figure 1:
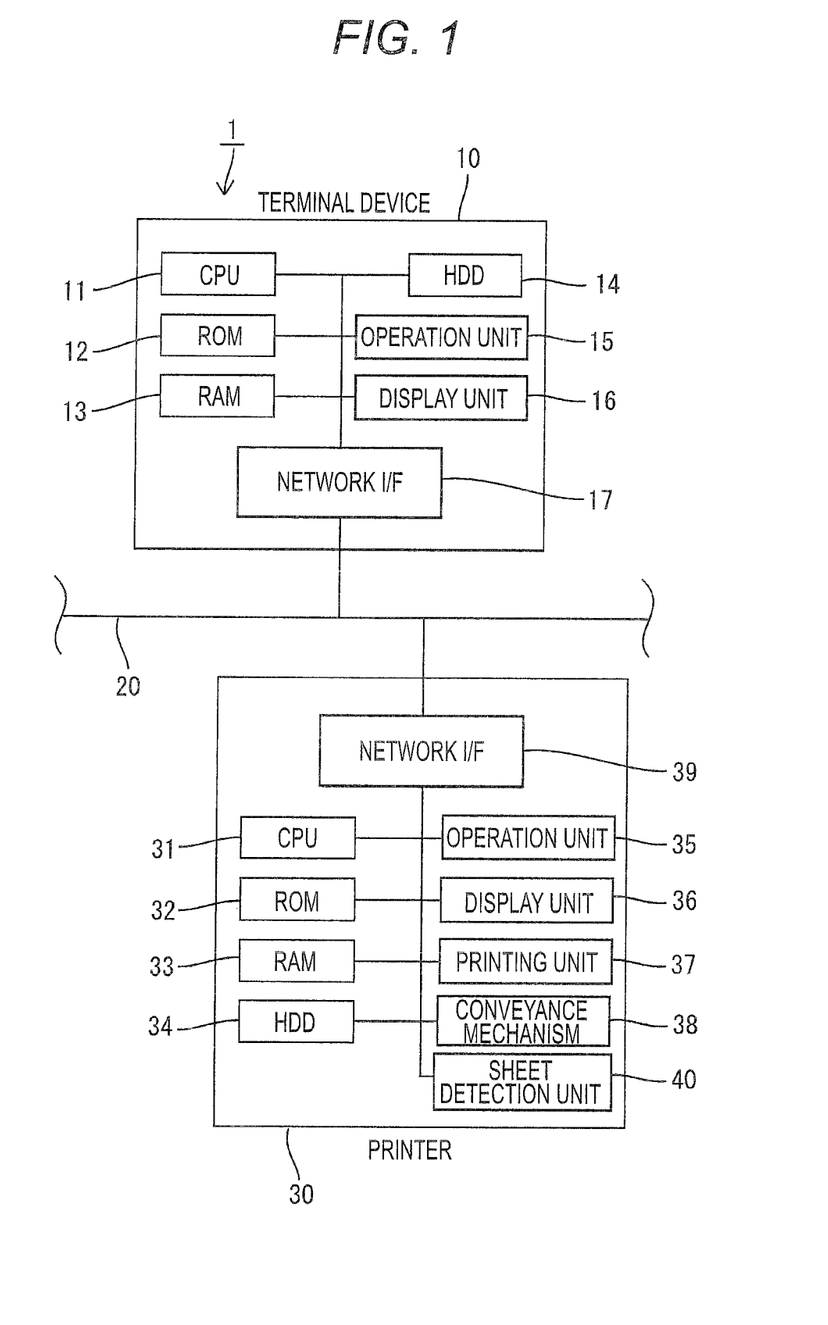
FIG. 1 is a block diagram illustrating the electrical configuration of a printing system according to an embodiment of the present invention.

FIG. 1 is a block diagram illustrating the electrical configuration of a printing system 1 according to an embodiment of the present invention. The printing system 1 includes a terminal device 10 as an example of a personal computer and an information processing device and a printer 30 as an example of a printing apparatus.

The terminal device 10 includes a CPU 11 as an example of an acquisition unit, a ROM 12, a RAM 13, a hard disk drive (HDD) 14 as an example of a memory, an operation unit 15 having a keyboard or pointing device, a display unit 16 having a liquid crystal display or the like, and a network interface 17 connected to a communication line 20. The HDD 14 stores an operating system (OS), application software capable of writing printing data, and various programs such as a printer driver for controlling the printer 30.

The printer 30 includes a CPU 31 (an example of a control unit, and a changing unit), a ROM 32, a RAM 33, a HDD 34, an operation unit 35, a display unit 36, a printing unit 37, a conveyance mechanism 38, a network interface 39, and a sheet detection unit 40. The ROM 32 stores various programs for controlling the operation of the printer 30. The CPU 31 controls the operation of the printer 30 in accordance with a program read from the ROM 32, while storing the processing result into the RAM 33.

The operation unit 35 includes a plurality of buttons through which a variety of input operations such as a printing start instruction can be made by a user. The display unit 36 includes a liquid crystal display or lamp to display various setting screens or operation states. The printing unit 37 performs printing on a sheet W such as a paper. The network interface 39 is connected to the external terminal device 10 or the like through the communication line 20 such that interactive data communication can be performed. The conveyance mechanism 38 and the sheet detection unit 40 will be described below.

2. Internal Configuration of Printer

Figure 2:
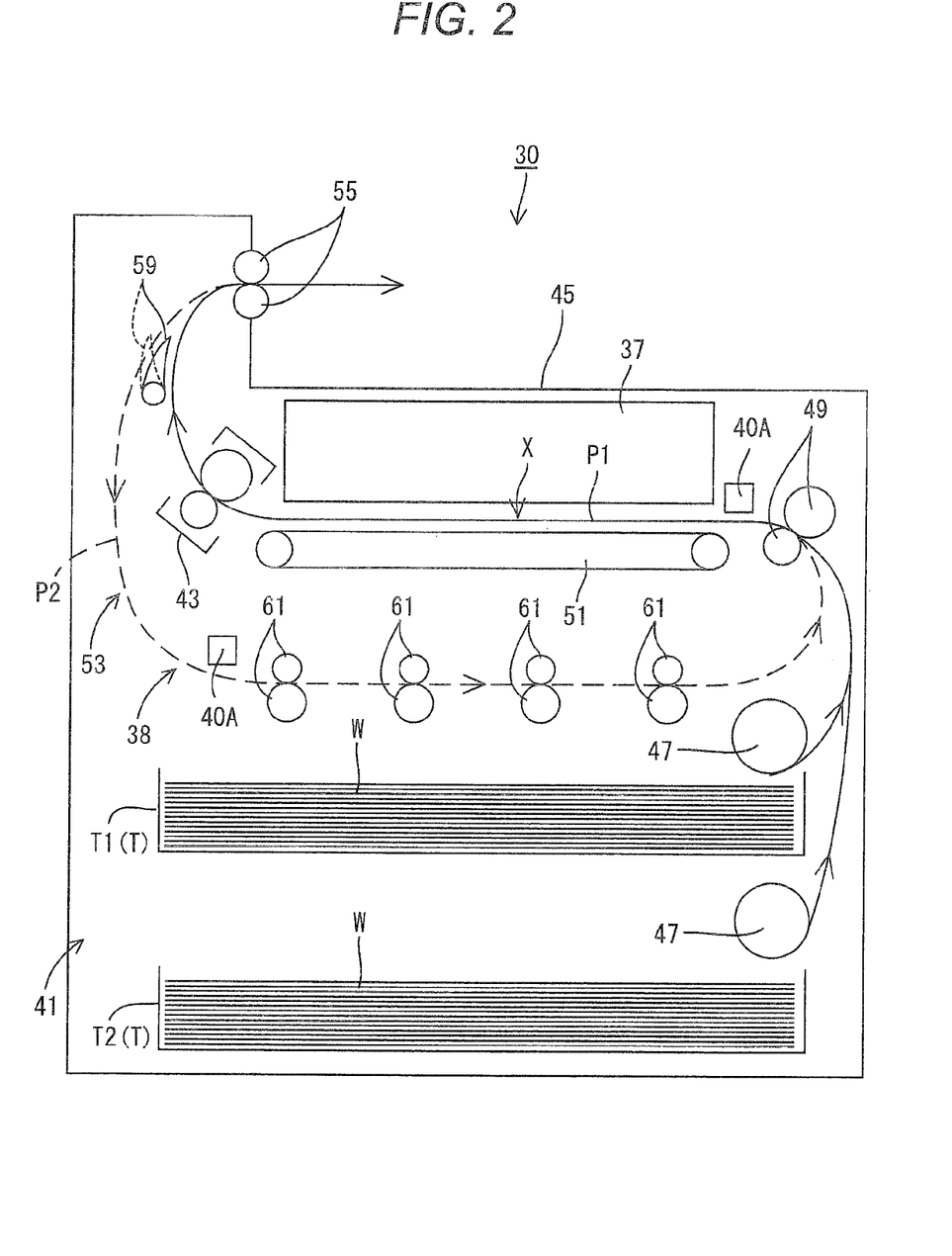
FIG. 2 is a schematic view illustrating the internal configuration of the printer.

FIG. 2 is a schematic view illustrating the internal configuration of the printer 30.

The printer 30 includes a housing unit 41, the conveyance mechanism 38, the printing unit 37, a fixing unit 43, and a discharge tray 45.

The housing unit 41 is provided in the bottom portion of the printer 30, and includes a plurality (for example, two) of trays T, each of which accommodates sheets W. Hereinafter, when the respective trays T are discriminated, they are sequentially referred to as a first tray T1 and a second tray T2 from the uppermost tray.

The conveyance mechanism 38 includes a pickup roller 47, a pair of registration rollers 49, 49, a sheet conveyance belt 51, and a reversing mechanism 53. The pickup roller 47 picks up the sheets W accommodated in the tray T one by one, and then conveys the sheet W to the registration rollers 49, 49. The registration rollers 49, 49 adjust the posture of the conveyed sheet W to deliver onto the sheet conveyance belt 51 at predetermined timing.

The printing unit 37 forms an image (monochrome image or color image) at a predetermined printing position X on the sheet W conveyed by the sheet conveyance belt 51, based on printing data received from the terminal device 10, for example. The sheet W having the image formed thereon is thermally fixed by the fixing unit 43 and then discharged onto the discharge tray 45. A path for guiding the sheet W from the tray T to the printing position X, which is indicated by a solid arrow of FIG. 2, is referred to as a printing conveyance path P1 as an example of printing paths.

The reversing mechanism 53 includes a discharge roller 55, a reverse conveyance path P2 as an example of reverse paths, which is indicated by the dotted-line arrow in FIG. 2, a flapper 59, and a plurality of reversing conveyance rollers 61. For example, when double-side printing is performed by the double-side continuous printing method, an image is printed on the rear surface of the sheet W by the printing unit 37. The rear surface corresponds to a lower surface of the sheet W when the sheet W is accommodated. Then, the sheet W is conveyed to the discharge roller 55. The sheet W is conveyed through the flapper 59, the reverse conveyance path P2, the plurality of reversing conveyance rollers 61, and the registration rollers 49, 49 by the reverse rotation of the discharge roller 55, and then delivered onto the tray 51 in a state in which the front and rear surfaces are reversed. Then, an image is printed on the front surface of the sheet W by the printing unit 37, which corresponds to an upper surface of the sheet W when the sheet W is accommodated in the tray T, and the sheet W is discharged onto the discharge tray 45.

The sheet detection unit 40 includes a plurality of sensors 40A which outputs a detection signal depending on whether or not a sheet W is present at the respective conveyance positions inside the conveyance mechanism 38. When the CPU 31 consecutively receives a detection signal indicating the presence of the sheet W from the respective sensors 40A for a predetermined time or more or does not receive a detection signal for a predetermined time or more, the CPU 31 determines that jamming (sheet jamming) occurred at the respective positions. In this embodiment, as illustrated in FIG. 2, one or more sensors 40A are provided in the printing conveyance path P1 and the reverse conveyance path P2, respectively. Therefore, the CPU 31 also can determine whether or not jamming occurs in any one of the printing conveyance path P1 and the reverse conveyance path P2.

3. Methods of Double-Side Printing Processing

Figure 3:
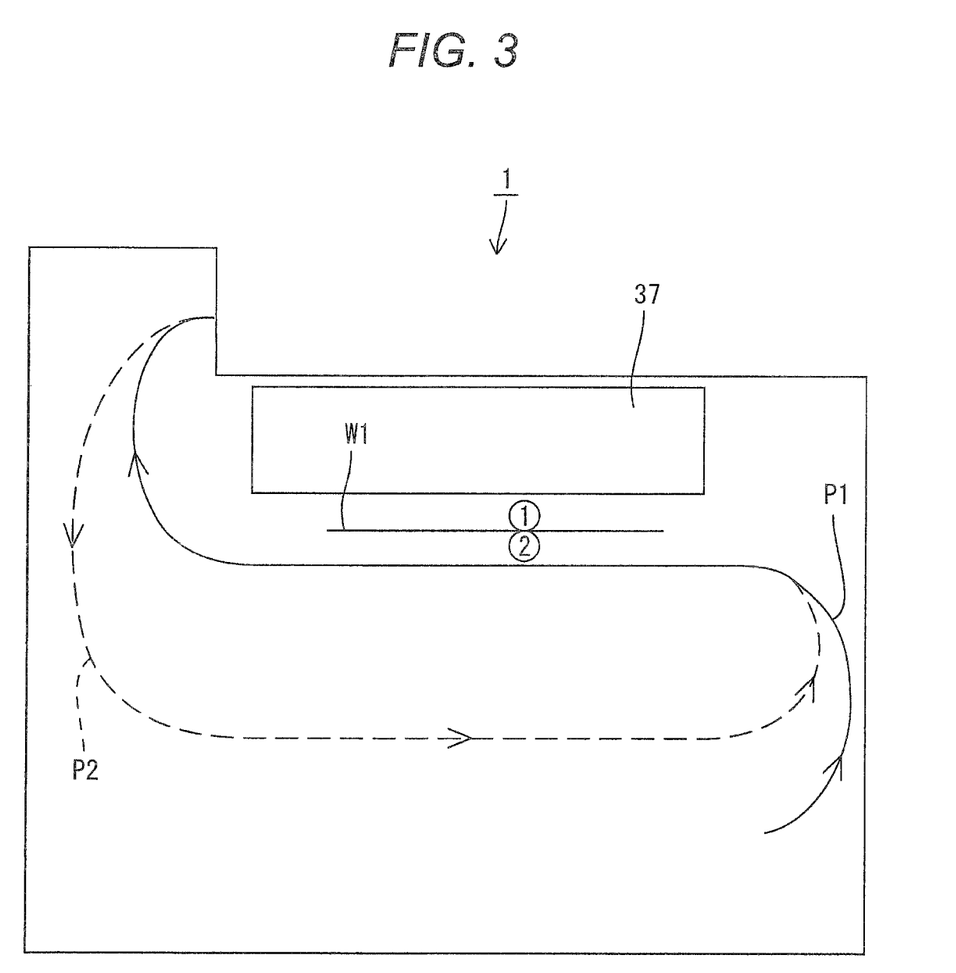
FIG. 3 is a pattern diagram explaining a 21 method.
Figure 4:
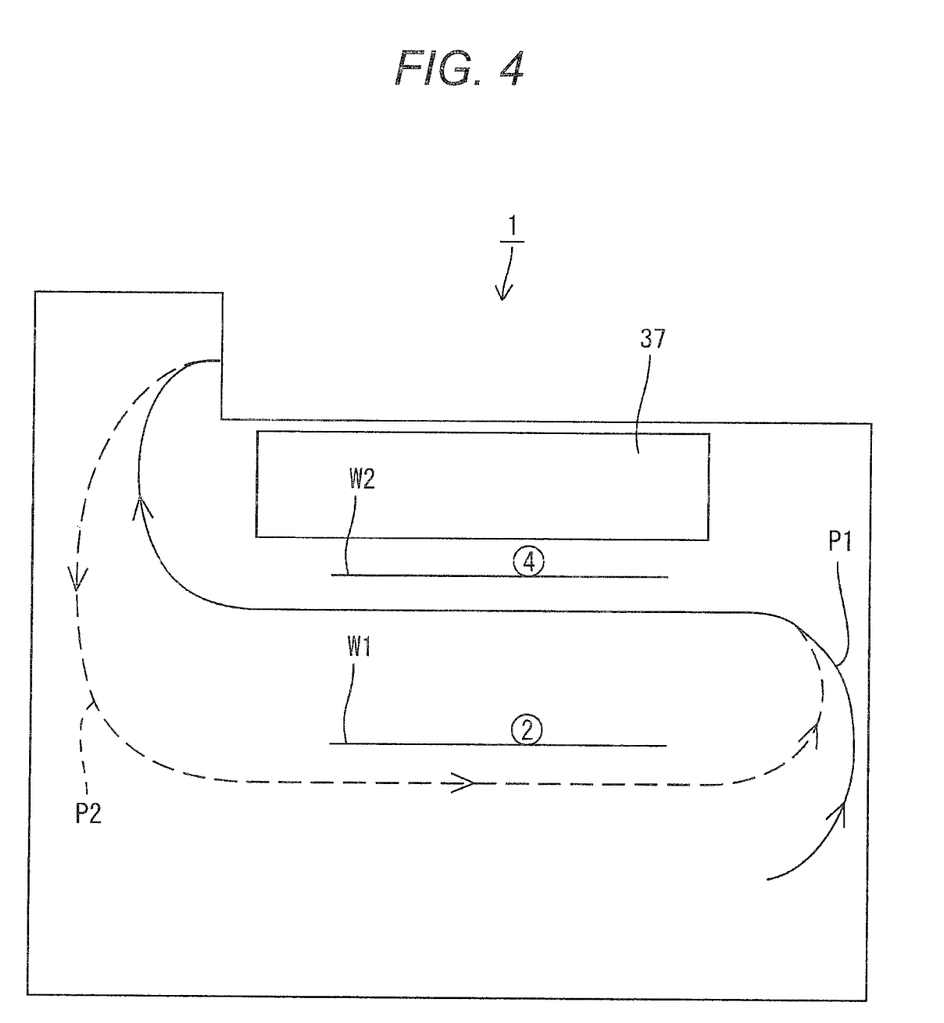
FIG. 4 is a pattern diagram explaining a 2413 method.
Figure 5:
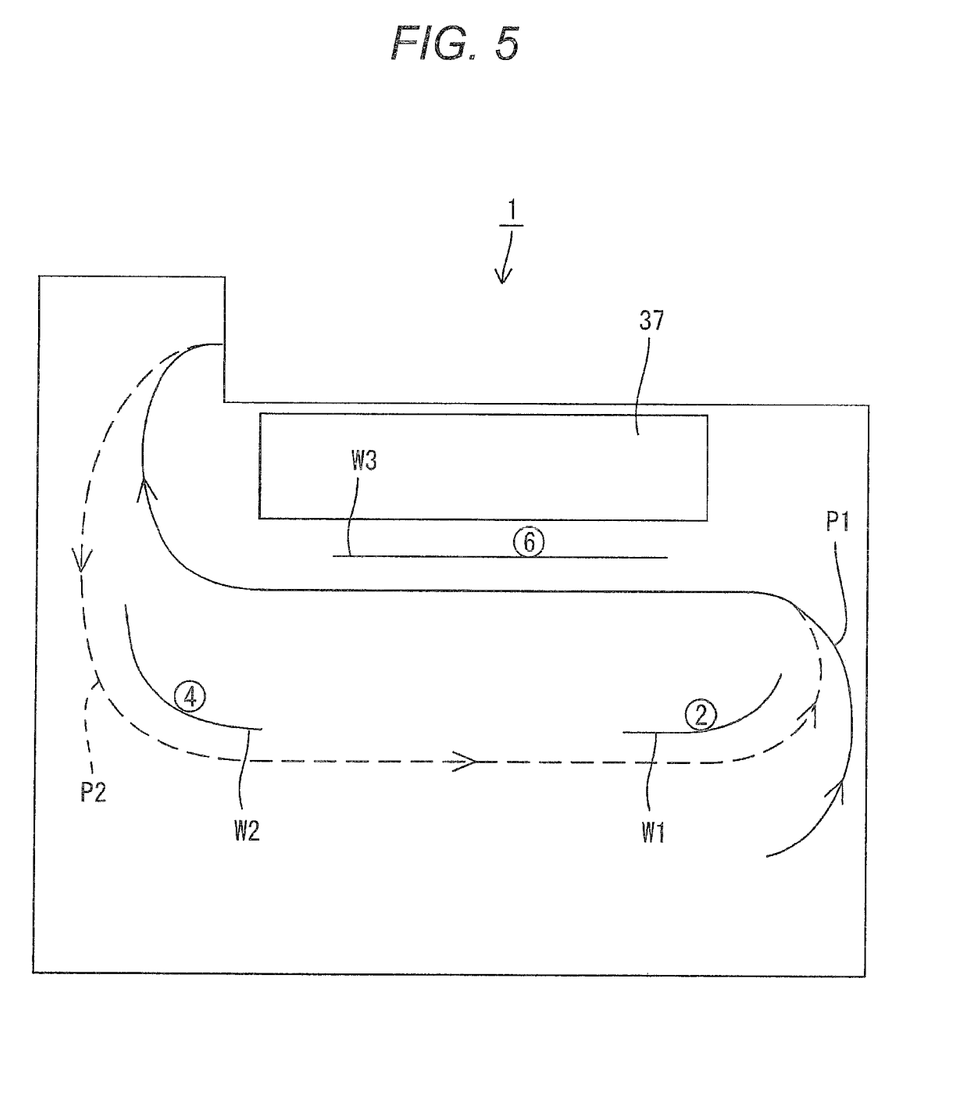
FIG. 5 is a pattern diagram explaining a 246135 method.

FIGS. 3 to 5 are pattern diagrams explaining methods of the double-side printing processing. In the respective drawings, a number surrounded by a circle means that an image corresponding to the sequence of the number is formed on the surface of sheet W at the side where the number is attached. The printer 30 can perform the double-side printing method depending on a plurality of methods. The plurality of methods are classified into a reversing method which uses the reversing mechanism 53 and a non-reversing method which does not use the reversing mechanism 53. The reversing method is classified depending on a difference in the maximum number of sheets W existing in the conveyance mechanism 38 at the same time. The sheets W have an image formed on one surface thereof, and does not have an image formed on the other surface thereof. Hereinafter, examples of the methods will be described.

(Reversing Method)

Method of which the Maximum Sheet Number is 1:21 Method

Method of which the maximum sheet number is 2:2413 method (an example of a definite loop type in which an operation of performing printing on the front surfaces of a plurality of sheets after performing printing on the rear surfaces of the sheets is repeated) and 241635 method (an example of an infinite loop type in which while printing is performed on the front surface of a sheet after printing is performed on the rear surface of the sheet, printing is performed on a new sheet W)

Method of which the maximum sheet number is 3:246135 method (an example of the definite loop type) (Although not illustrated, there is also an infinite loop type.)

(Non-Reversing Method)

Method of which the Maximum Sheet Number is 0 Manual Method

The 21 method is a double-side continuous printing method in which printing on one surface and printing on the other surface for each sheet W1 are continuously performed from the beginning to the end of the printing. For example, when six page images are printed on both surfaces of three sheets W, the printer 30 performs printing in the following sequence:

Second image (rear surface of first sheet W1)
First image (front surface of first sheet W1)
Fourth image (rear surface of second sheet W2)
Third image (front surface of second sheet W2)
Sixth image (rear surface of third sheet W3)
Fifth image (front surface of third sheet W3)

In the 21 method, while printing is performed on the front surface of a sheet W after the printing is performed on the rear surface of the sheet W, the printer 30 does not perform printing on another sheet W. For example, as illustrated in FIG. 3, while the first image is printed on the front surface of the sheet W1 after the second image is printed on the rear surface of the first sheet W1, the second sheet W or later is not printed. Accordingly, the maximum sheet number is one.

The 2413 method includes a process in which while printing is performed on the front surface of a sheet W after printing is performed on the rear surface of the sheet W, printing is performed on the rear surface of another sheet W. For example, when six page images are printed on both surfaces of three sheets W, the printer 30 performs printing in the following sequence:

Second image (rear surface of first sheet W1)
Fourth image (rear surface of second sheet W2)
First image (front surface of first sheet W1)
Third image (front surface of second sheet W2)
Sixth image (rear surface of third sheet W3)
Fifth image (front surface of third sheet W3)

In the 2413 method, as illustrated in FIG. 4, when the first sheet W1 having the second image printed thereon exists in the reverse conveyance path P2, the second sheet W2 exists in the printing conveyance path P1. Accordingly, the maximum sheet number is two.

The 246135 method includes a process in which while printing is performed on the front surface of a sheet W after printing is performed on the rear surface of the sheet W, printing is performed on the rear surfaces of two other sheets W. For example, when six page images are printed on both surfaces of three sheets W, the printer 30 performs printing in the following sequence:

Second image (rear surface of first sheet W1)
Fourth image (rear surface of second sheet W2)
Sixth image (rear surface of third sheet W3)
First image (front surface of first sheet W1)
Third image (front surface of second sheet W2)
Fifth image (front surface of third sheet W3)

In the 246135 method, as illustrated in FIG. 5, when the first sheet W1 having the second image printed thereon and the second sheet W2 having the fourth image printed thereon exist in the reverse conveyance path P2, the third sheet W3 exists in the printing conveyance path P1. Accordingly, the maximum sheet number is three. Hereinafter, the 246135 method will be omitted to simplify the descriptions.

In the manual method, one or more sheets W are discharged to the discharge tray 45 without passing through the reverse conveyance path P2, in a state in which only the rear surfaces thereof are printed. The discharged sheets W are reset on the tray T by a user such that the rear surfaces (printed surfaces) thereof face upward. Then, the front surface of the reset sheets W are printed, and the sheets W are discharged to the discharge tray 45 without passing through the reverse conveyance path P2. Accordingly, in the manual method, the maximum sheet number is 1 or 2 which is the number of sheets which can be accommodated in the printing conveyance path P1, but the sheets do not pass through the reverse conveyance path P2.

4. Printing Control Processing

The printing system 1 performs printing control processing which will be described below, such that double-side printing processing can be performed in accordance with a method selected automatically from the above-described methods according to jamming occurrence probability of the printer 30. Hereinafter, the following descriptions of the printing control processing will be divided into processing at the terminal device 10 and processing at the printer 30.

4-1. Processing at Terminal Device

Figure 6:
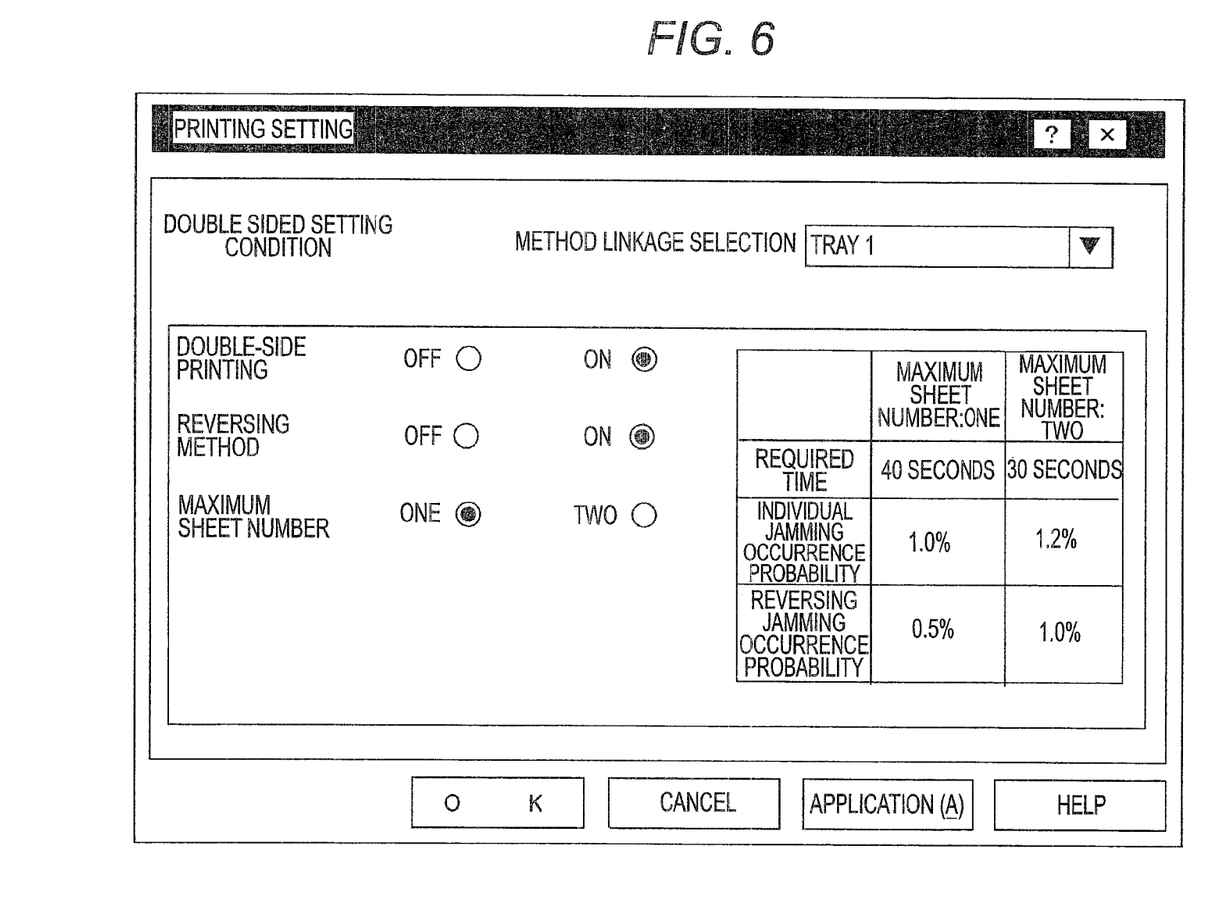
FIG. 6 is a diagram showing a double-side printing setting screen.

FIG. 6 is a diagram illustrating a double-side printing setting screen. When a user inputs a printing request on application software handling a document or image through the operation unit 15, the CPU 11 reads the printer driver from the HDD 14 to selectively display a basic setting screen for setting general printing conditions such as sheet size and image quality, extended function screens, and a support screen on the display unit 16. The double-side printing setting screen is one of the extended function screens.

The double side setting screen includes a tray selection field, a double-side printing field, a reversing method field, and a maximum sheet number field. In the double-side printing field, as a user switches over between ON and OFF buttons, any one of the double-side printing processing and the one side printing processing can be selectively performed. Furthermore, when the one side printing processing is selected, that is, the OFF button is clicked, the other fields may be grayed out so as not to be selected.

In the reversing method field, as the user switches over between ON and OFF buttons, any one of the reversing method and the non-reversing method may be selected. Furthermore, when the non-reversing method is selected, that is, the OFF button is clicked, the maximum sheet number field and the manual method auto-switching field may be grayed out so as not to be selected.

In the maximum sheet number field, due to the user selecting a sheet number (one or two), the user can select a reversing method corresponding to the selected sheet number.

In the tray selection field, the number of the tray T (the first tray T1 or the second tray T2) is pull-down displayed so that the user can select a tray.

The double-side printing setting screen may display jamming information on the methods of the double-side printing processing which can be performed by the printer 30. The jamming information includes a required time, an individual jamming occurrence probability, and an individual reversing jamming occurrence probability for each of the methods whereby the maximum sheet numbers are different from each other. The required time is the average required time when a reference number (for example, ten) of sheets W are printed. The reference number of sheets may be a fixed value, or the number of printed sheets for each printing data. In the latter, a time obtained by multiplying the reference number by a unit required time per sheet W1 for each of the methods may be set to the required time.

The individual jamming occurrence probability refers to an occurrence probability of jamming (hereinafter, referred to as individual jamming) which occurs in the printer 30 including the printing conveyance path P1 and the reverse conveyance path P2, when the double-side printing processing is performed using each of the methods. In this embodiment, the individual jamming occurrence probability is calculated by dividing the number of occurrences of individual jamming by the accumulative number of printed sheets W in the printer 30. Especially, it is preferable to use the accumulative number of double-side printed sheets. The individual reversing jamming occurrence probability refers to an occurrence probability of jamming (hereinafter, referred to as individual reversing jamming) which occurs only in the reverse conveyance path P2. In this embodiment, the individual reversing jamming occurrence probability is calculated by dividing the number of occurrences of individual reversing jamming by the accumulative number of printed sheets.

Figures 7, 7A:
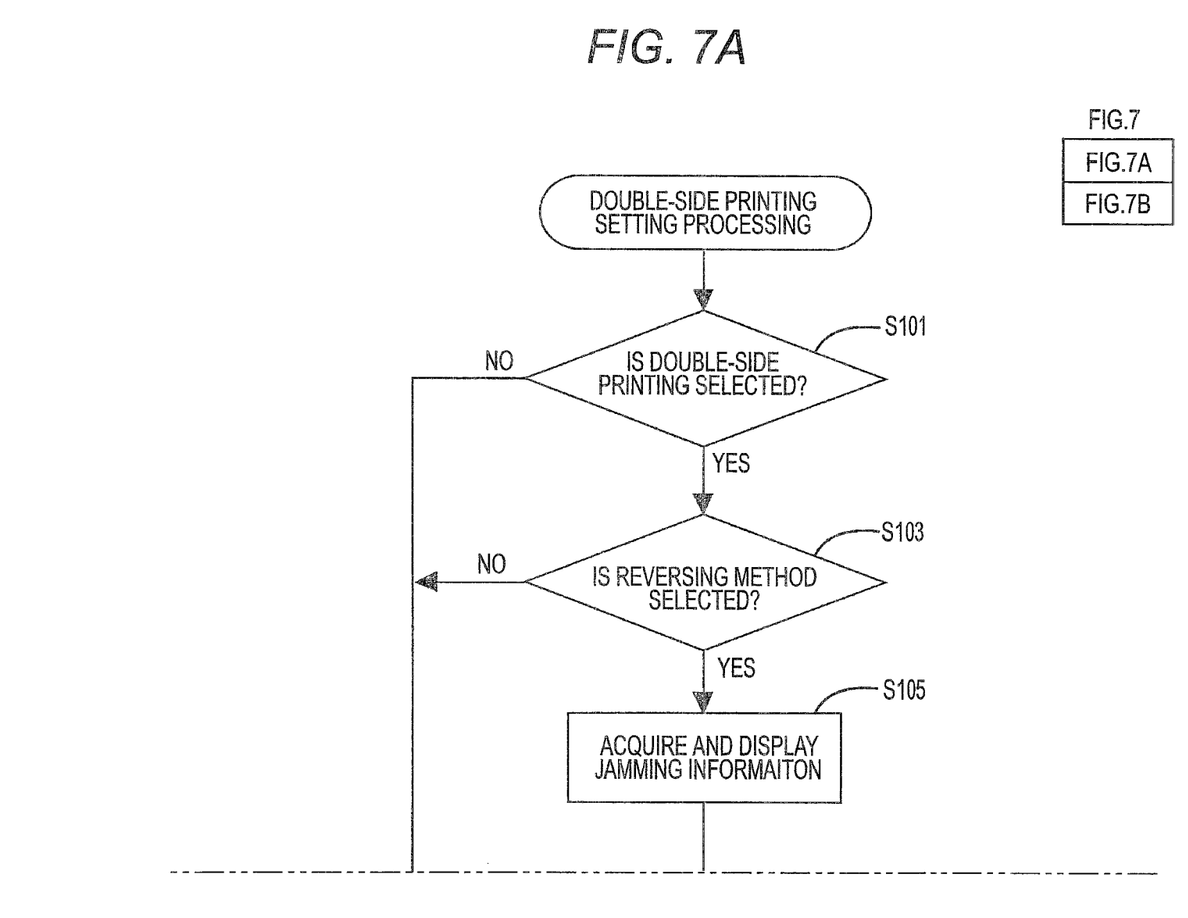
FIG. 7 is a flow chart showing double-side printing setting processing.
Figure 7B:
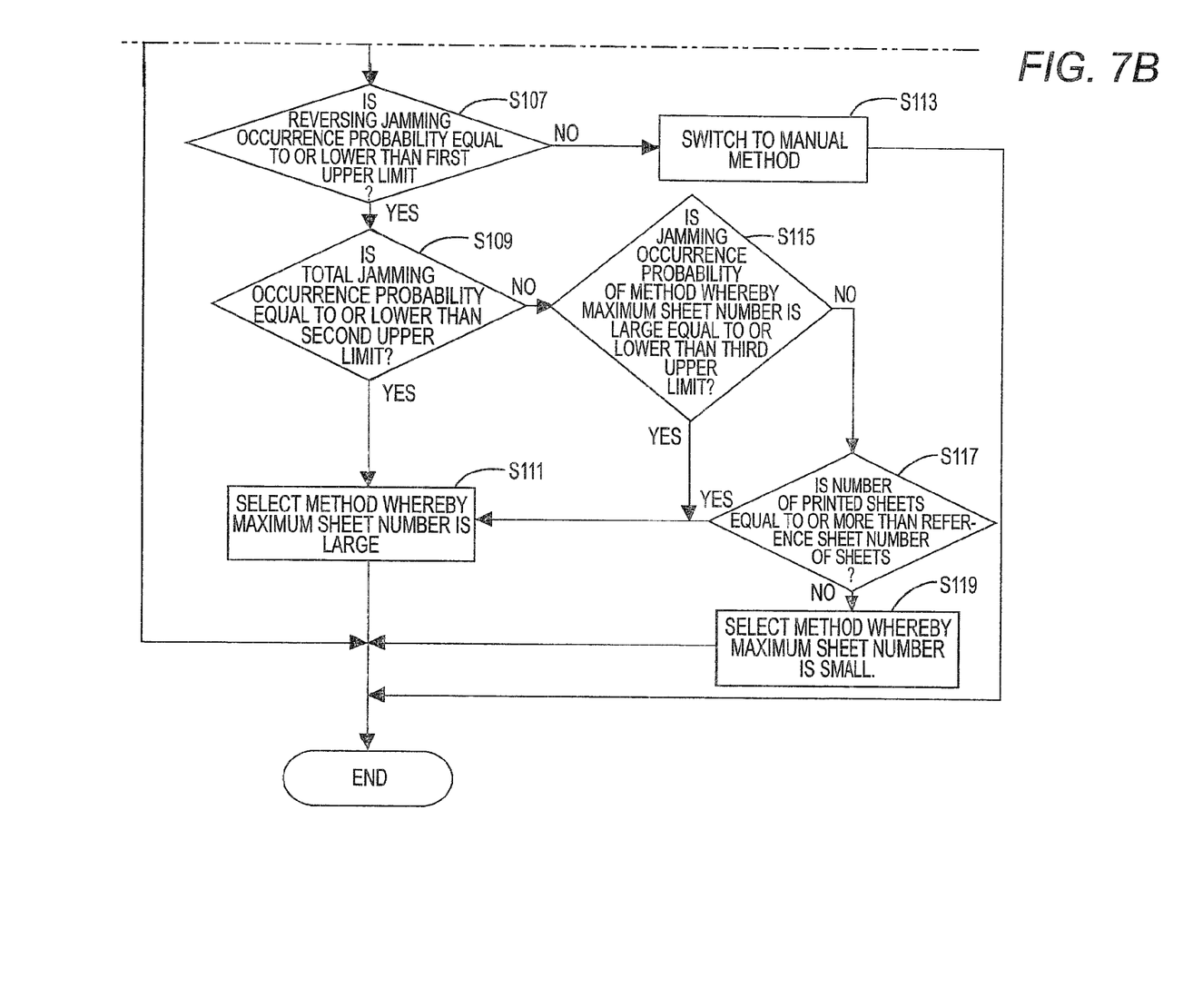

FIG. 7 is a flow chart showing the double-side printing setting processing. When the double-side printing setting screen is displayed on the display unit 16, the CPU 11 performs the double-side printing setting processing. In the beginning of the double-side printing setting processing, the jamming information is not displayed on the double-side printing setting screen.

First, when it is determined that a user selects the one sided printing and then clicks an OK button or application button on the printing setting screen (step S101: NO), the double-side printing setting processing is terminated. When it is determined that the user selects the double side printing and the non-reversing method and then clicks the OK button or application button on the printing setting screen (step S101: YES and step S103: NO), the double-side printing setting processing is terminated.

Meanwhile, when it is determined that a reversing method is selected (step S103: YES), the latest jamming information is received from the printer 30 and then displayed on the double-side printing setting screen (step S105) (refer to FIG. 6). Accordingly, the user can check the jamming occurrence probabilities of the respective methods by referring to the displayed jamming information.

Next, the CPU 11 determines whether or not an average occurrence probability of reversing jamming is equal to or lower than a first upper limit (for example, 5%), by referring to the jamming information (step S107). The average occurrence probability of reversing jamming refers to an average of individual reversing jamming occurrence probabilities in the respective reversing methods. Instead of the average occurrence probability of reverse jamming, an occurrence probability of individual reversing jamming in a method predetermined as a default value may be set to a determination target. When it is determined that the average occurrence probability of reversing jamming is higher than the first upper limit (step S107: NO), it is considered that there is a high risk of jamming occurrence if the double-side printing processing is performed in accordance with the reversing method, and the method is forcibly switched to the manual method (step S113). Then, the double-side printing setting processing is terminated.

On the other hand, when it is determined that the average occurrence probability of reversing jamming is equal to or lower than the first upper limit (step S107: YES), it is determined whether or not the total jamming occurrence probability is equal to or lower than a second upper limit (for example, 1%), by referring to the jamming information (step S109). An average occurrence probability of total jamming refers to an average of individual jamming occurrence probabilities in the respective reversing methods. Instead of the average occurrence probability of total jamming, the occurrence probability of reversing jamming in a method predetermined as a default value (for example, a method whereby the maximum sheet number is large) may be set to a determination target.

When it is determined that the total jamming occurrence probability is equal to or lower than the second upper limit (step S109: YES), a method (2413 method) is selected whereby the maximum sheet number is large (step S111), and the double-side printing setting processing is terminated. Furthermore, when the occurrence probability of reversing jamming in the default method is set to a determination target, the default method is selected.

When it is determined that the total jamming occurrence probability is higher than the second upper limit (step S109: NO), it is determined whether or not the individual jamming occurrence probability of the method whereby the maximum sheet number is large is equal to or lower than a third upper limit (for example, 2%) (step S115). At this time, the CPU 11 functions as a determination unit. When it is determined that the individual jamming occurrence probability is equal to or lower than the third upper limit (step S115: YES), it is considered that there is a low risk of jamming occurrence even though the double-side printing processing is performed in accordance with the method (2413 method) whereby the maximum sheet number is large, and the method is selected whereby the maximum sheet number is large (step S111). Then, the double-side printing setting processing is terminated. When a relative difference in individual jamming occurrence probability between the method whereby the maximum sheet number is large and the method whereby the maximum sheet number is small is less than a reference value (for example, 0.5%), the method may be selected whereby the maximum sheet number is large.

On the other hand, although it is determined that the individual sheet jamming occurrence is higher than the third upper limit (step S115: NO), the method whereby the maximum sheet number is large is selected in preference to high-speed processing rather than jamming avoidance (step S111), when the number of sheets W (corresponding to the page number of printing data) which are printed by the double-side printing processing based on printing data of the currently-set target is equal to or more than a reference sheet number of sheets (for example, 30 sheets) (step S117: YES). Then, the double-side printing setting processing is terminated in preference to high-speed processing rather than jamming avoidance.

Meanwhile, when the number of sheets W printed by the double-side printing processing is less than the reference number (step S117: NO), a method (21 method) whereby the maximum sheet number is small is selected in preference to jamming avoidance (step S119), and the double-side printing setting processing is terminated.

When the user clicks the OK button or application button of the printing setting screen after the double-side printing setting processing is terminated, the CPU 11 transmits printing data and the variety of printing setting information set on the printing setting screen to the printer 30. The printing data includes image data to be printed, and the variety of printing setting information includes the method of the double-side printing processing.

4-2. Processing at Printer

When receiving the printing data and the printing setting information form the terminal device 10, the CPU 31 of the printer 30 controls the printing unit 37 and the conveyance mechanism 38 based on the printing data, and starts the double-side printing processing of the method depending on the printing setting information. At this time, the CPU 31 functions as the control unit. Furthermore, when the double-side printing processing starts, the CPU 31 starts jamming monitoring processing.

Figure 8:
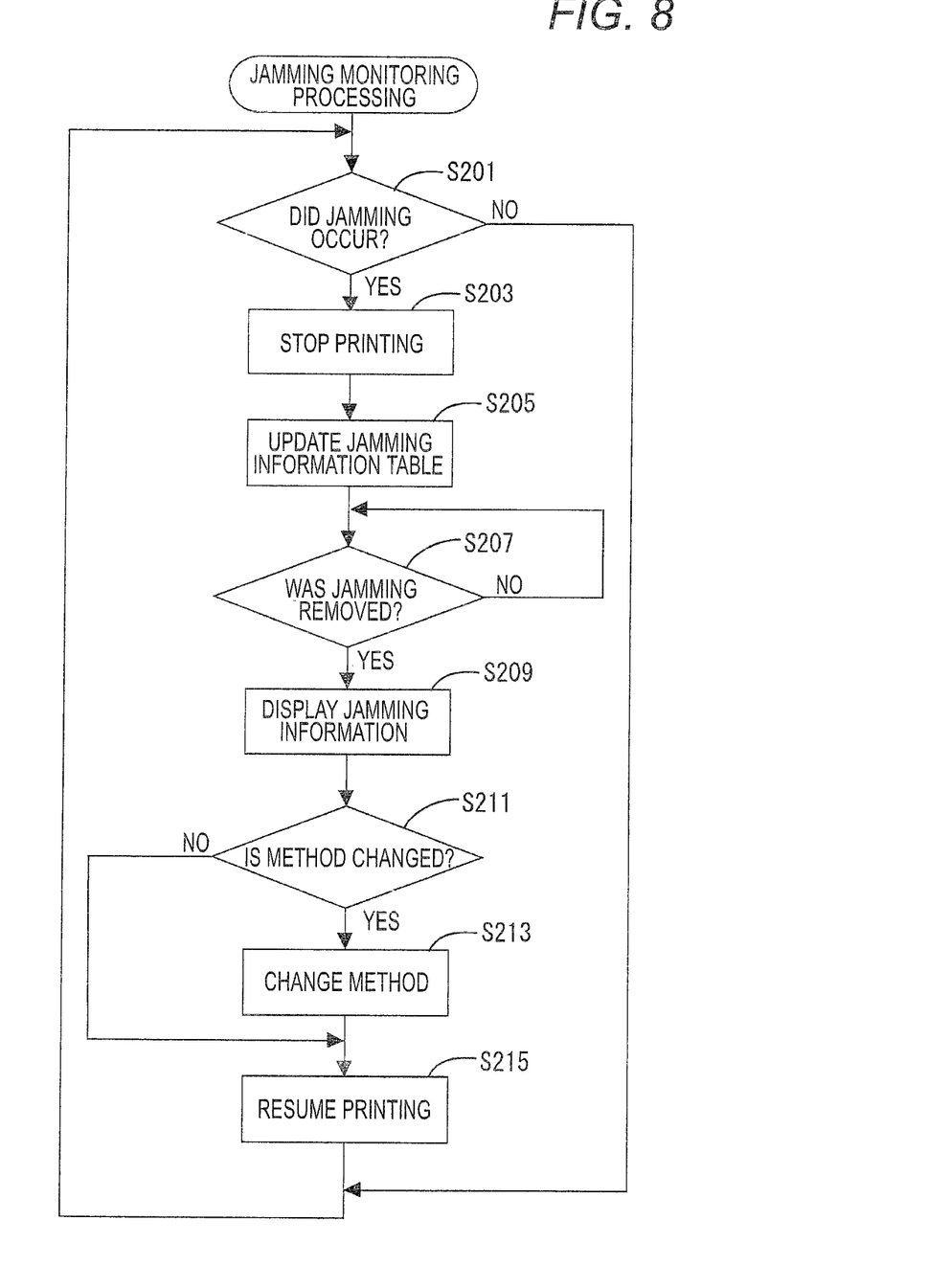
FIG. 8 is a flow chart showing jamming monitoring processing.

FIG. 8 is a flow chart showing jamming monitoring processing. The CPU 31 monitors whether jamming occurred or not, based on detection signals from the respective sensors 40A (step S201). When it is determined that jamming occurred (step S201: YES), the CPU stops the double-side printing processing (step S203), and updates the jamming information table (step S205).

Figure 9:
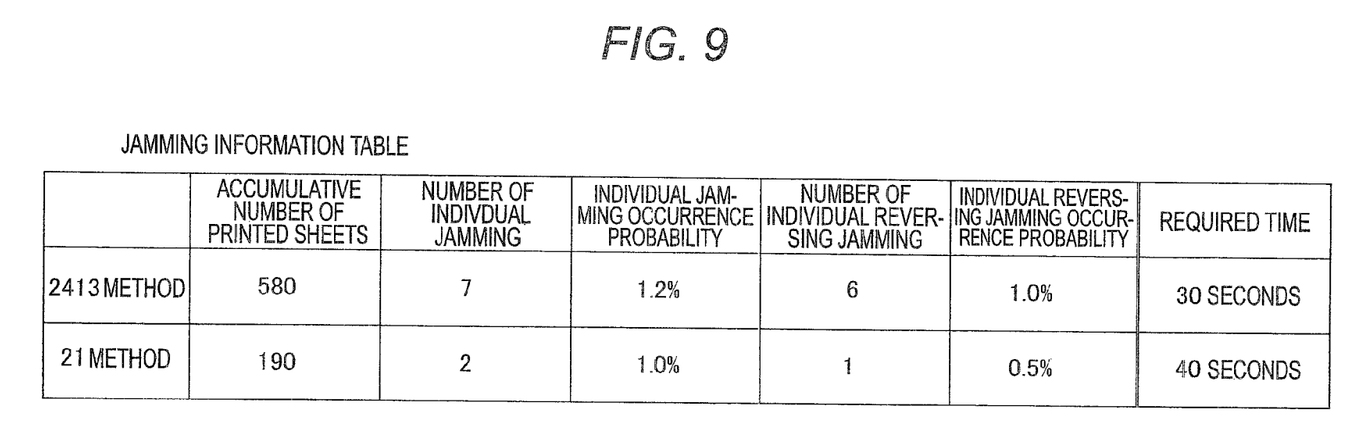
FIG. 9 is a diagram showing an example of contents of a jamming information table.

FIG. 9 is a diagram showing an example of the contents of the jamming information table. The jamming information table is original data for generating the jamming information transmitted to the terminal device 10, and is stored in the HDD 34. The jamming information table stores the accumulative number of printed sheets, the total number of jamming, the total jamming occurrence probability (=(the total number of jamming/the total jamming occurrence probability×100), the number of reversing jamming, and the reversing jamming occurrence probability (=(the number of reversing jamming/the reversing jamming occurrence probability×100) for each of the reversing methods. The CPU 31 calculates the total jamming occurrence probability whenever jamming occurs, and updates the jamming information table.

Next, it is determined whether the jamming was removed or not (step S207). For example, when detection signals indicating no sheet exists are received from all of the sensors 40A, it is determined that the jamming was removed. When it is determined that the jamming was removed (step S207: YES), the jamming information the same as shown in FIG. 6, for example, is displayed on the display unit 36 (step S209). When checking the displayed contents (the jamming occurrence probability and the required time), the user can determine whether or not to continue the method which is being performed.

The user can change the method of the double-side printing processing through the operation unit 35. When the method is not changed (step S211: NO), the double-side printing processing is resumed as the method before the jamming occurrence (step s215), and the operation returns to step S201. When the method is changed into another method (step S211: YES), the double-side printing processing is resumed as the changed method (step S215), and the operation returns to step S201. At this time, the CPU 31 functions as the changing unit. When the double-side printing processing is terminated, the jamming monitoring processing is also terminated.

5. Effect of This Embodiment

According to the embodiment of the present invention, when the jamming occurrence probability is high, the double-side printing processing is performed in accordance with a method whereby the maximum sheet number of sheets existing in the conveyance mechanism 38 at the same time is small, compared with when the jamming occurrence probability is low. Accordingly, it is possible to perform the double-side printing processing in accordance with the method depending on the jamming occurrence state of the printer 30. For example, when the occurrence probability is relatively low, the printing can be performed at a high speed by performing the double-side printing processing in accordance with the method whereby the maximum sheet number is large. Meanwhile, when the occurrence probability is relatively high, the double-side printing processing may be performed in accordance with the method whereby the maximum sheet number is small. In this case, it is possible to reduce the effort of a sheet removing operation which would be performed if jamming occurs.

When the reversing jamming occurrence probability is relatively high, the non-reversing method may be selected without using the reverse conveyance path P2, which makes it possible to reduce the jamming occurrence.

When jamming has occurred in the middle of the double-side printing processing, the jamming management processing may be performed to change the method of the double-side printing processing at this point of time. Furthermore, when the number of sheets W to be double-side printed is relatively large, the method whereby the maximum sheet number is large may be selected to perform the double-side printing processing at a high speed.

<Other Embodiments>

The present invention is not limited to the exemplary embodiment explained with reference to the above descriptions and the drawings, but the following various embodiments are also included in the technical scope of the present invention. In particular, components other than those of the most significant invention among the components of the respective embodiments are additional components, and thus may be properly omitted.

(1) In the above-described embodiment, the 21 method, the 2413 method, and so on have been described as methods of the double-side printing processing, but the present invention is not limited thereto. For example, a 24163857 method of which the maximum sheet number is three may be adopted. That is, while one surface of a sheet is printed and the other surface thereof is then printed, one surfaces of N other sheets (equal to or more than zero) may be printed. In the respective methods, the number of N sheets is not necessarily constant (refer to the 2413 method), but the number of sheets W which exist in the conveyance mechanism 38 when the number of N sheets is the highest may be set to the maximum sheet number.

Although the example in which the double-side printing setting processing is performed at the terminal device 10 has been described in the above-described embodiment, the invention is not limited thereto. For example, the CPU 31 of the printer 30 may execute the setting processing by utilizing the operation unit 35 and the display unit 36. In this case, the CPU 31 functions as the "determination unit".

(3) In the above-described embodiment, it has been described that the tray T is provided in the bottom portion of the printer 30, but the present invention is not limited thereto. For example, a manual feed tray (not shown) for guiding sheets to the registration rollers 49 from an insertion port (not shown) opened in the front surface of the printer 30 may be provided. Furthermore, in the manual method, the manual feed tray may be used.

(4) In the above-described embodiment, the level of the jamming occurrence probability is determined in the respective methods, based on the detection signals from the respective sensors 40A, but the present invention is not limited thereto. For example, the respective methods (the maximum sheet numbers) and the jamming occurrence probabilities may be experimentally obtained, and the correspondence relation table thereof may be stored in the HDD 14. Then, the CPU 11 may determine the level of the jamming occurrence probability by referring to the correspondence table. Furthermore, at least any one of temperature, humidity, color, the color number (color or monochrome), a material of the sheets W (thick paper, regular paper, or OHP paper), the type of the tray T, the accumulative number of printed sheets, the number of roller rotations and so on and the jamming occurrence probability may be experimentally obtained, and the correspondence relation table thereof may be stored in the HDD 14. Then, the CPU 11 may determine the level of the jamming occurrence probability by referring to the correspondence relation table.

(5) In the above-described embodiment, when the reversing jamming occurrence probability is higher than the first upper limit in the double-side printing setting processing, the method is switched to the manual method (refer to steps S107 and S113 of FIG. 7), but the present invention is not limited thereto. When there is a reversing method having a lower individual reversing jamming occurrence probability than the method selected in the double-side printing setting processing, the CPU 31 may automatically switch the method into the reversing method.

In the above-described embodiment, all the determinations of steps S107, S109, S115, and S117 are performed in the double-side printing setting processing, but the present invention is not limited thereto. There may be a configuration where at least one of them is performed. For example, in the configuration in which step S107 is omitted, the operation after step S105 proceeds to step S109. In the configuration in which step S109 is omitted, the operation proceeds to step S115 in the case of YES in step S107. In the configuration in which S115 is omitted, operation proceeds to S115 in the case of NO in step S109. In the configuration in which step S117 is omitted, the double-side printing setting processing is terminated in the case of NO in step S115.

(7) In the above-described embodiment, the method of the double-side printing processing is changed by the intention of a user, after the jamming is removed in the jamming monitoring processing, but the present invention is not limited thereto. For example, the CPU 31 may refer to the jamming information after the jamming occurrence, and automatically change the method into another method of which the jamming occurrence probability is low, under a condition in which it is determined that the jamming occurrence probability of the currently-selected method is higher than a predetermined upper limit.

(8) In the above-described embodiment, when jamming occurs in the jamming monitoring processing, the display of the jamming information and the operation of the method switching are performed at the printer 30, but the present invention is not limited thereto. For example, the jamming information may be displayed on the display unit 16 at the terminal device 10, and the method changing may be performed by the operation unit 15.

(9) In the above-described embodiment, the following configuration may be adopted. The CPU 31 monitors the accumulative number of printed sheets and the existence/nonexistence of jamming occurrence, and creates jamming information data for each tray T when double-side printing has been performed utilizing the tray T for each tray T. The CPU 11 performs the determination of high or low jamming occurrence probability, with reference to the jamming information data corresponding to the tray T selected in the doubled sided printing setting screen.

What is claimed is:

1. A printing device comprising:
a printing unit configured to perform printing on a sheet;
a conveyance mechanism that has a printing path for guiding a sheet to a printing position of the printing unit and a reverse path for reversing the sheet passing through the printing position and guiding the sheet again to the printing position;
a detection unit configured to detect a sheet jamming occurrence;
a control device configured to:
control the printing unit and the conveyance mechanism to perform double-side printing processing depending on a plurality of methods in which maximum numbers of the sheets existing in the conveyance mechanism at the same time are different from each other;
determine a level of a sheet jamming occurrence probability in the conveyance mechanism for a first method and a second method among the plurality of methods based on a number of sheet jamming occurrences detected by the detection unit;
if a relative difference in the sheet jamming occurrence probability between the first method and the second method is higher than a predetermined value of the relative difference, select the second method which has a second maximum number of the sheets existing in the conveyance mechanism at the same time;
if the relative difference is smaller than the predetermined value of the relative difference, select the first method which has a first maximum number of the sheets existing in the conveyance mechanism at the same time wherein the first maximum number is larger than the second maximum number; and
perform double-side printing processing in accordance with a selected method.

2. A non-transitory computer-readable medium storing a printer driver of a printing device having a conveyance mechanism and performing a double-side printing processing depending on a plurality of methods in which maximum numbers of sheets existing in the conveyance mechanism at the same time are different from each other, a detection unit is configured to detect a sheet jamming occurrence, the printer driver causing an information processing device which is connected to communicate with the printing device to perform:
determining a level of a sheet jamming occurrence probability in the conveyance mechanism for a first method and a second method among the plurality of methods based on a number of the sheet jamming occurrences detected by the detection unit;
if a relative difference in the sheet jamming occurrence probability between the first method and the second method is higher than a predetermined value of the relative difference, selecting the second method which has a second maximum number of the sheets existing in the conveyance mechanism at the same time;
if the relative difference is smaller than the predetermined value of the relative difference, selecting the first method which has a first maximum number of the sheets existing in the conveyance mechanism at the same time wherein the first maximum number is larger than the second maximum number; and
instructing the printing device to perform the double-side printing processing according to a selected method.

3. A printing system comprising:
a printing unit configured to print on a sheet;
a conveyance mechanism that has a printing path for guiding a sheet to a printing position of the printing unit and a reverse path for reversing the sheet passing through the printing position and guiding the sheet again to the printing position;
a detection unit configured to detect a sheet jamming occurrence,
a control device configured to:
perform a double-side printing processing depending on a plurality of methods in which maximum numbers of the sheets existing in the conveyance mechanism at the same time are different from each other;
determine a sheet jamming occurrence probability in the conveyance mechanism for a first method and a second method among the plurality of methods based on a number of the sheet jamming occurrences detected by the detecting unit; and
if a relative difference in the sheet jamming occurrence probability between the first method and the second method is higher than a predetermined value of the relative difference, select the second method which has a second maximum number of the sheets existing in the conveyance mechanism at the same time;
if the relative difference is smaller than the predetermined value of the relative difference, select the first method which has a first maximum number of the sheets existing in the conveyance mechanism at the same time wherein the first maximum number is larger than the second maximum number; and
perform the double-side printing processing in accordance with a selected method.

4. The printing system according to claim 3,
wherein when it is determined that the sheet jamming occurrence probability is higher than a first predetermined sheet jamming occurrence probability value, the control unit is further configured to select a method in which a maximum number of the sheets is smaller than when it is determined that the sheet jamming occurrence probability is lower than the first predetermined sheet jamming occurrence probability value, and perform the double-side printing processing in accordance with the selected method.

5. The printing system according to claim 4, wherein the control device is further configured to:
- determine a level of the sheet jamming occurrence probability in the reverse path;
- select a non-reversing method in which the reverse path is not used; and
- perform the double-side printing processing in accordance with the selected non-reversing method when it is determined that the sheet jamming occurrence probability is higher than a second predetermined sheet jamming occurrence probability value.

6. The printing system according to claim 4, wherein the control device is further configured to change the method of the double-side printing processing in accordance with the selected method, in the middle of the double-side printing processing performed by the printing unit.

7. The printing system according to claim 3, wherein the control device is further configured to select a first method from the plurality of methods, the first method having a first maximum number of the sheets, wherein the first maximum number of the sheets is larger than a second maximum number of sheets of a second method of the plurality of methods, if a number of sheets to be double-side printed is equal to or larger than a reference number of sheets.

* * * * *